United States Patent
Hirsch

(10) Patent No.: US 9,318,782 B2
(45) Date of Patent: Apr. 19, 2016

(54) TEMPERATURE CONTROL DEVICE FOR THE TEMPERATURE CONTROL OF A BATTERY AND METHOD FOR THE PRODUCTION OF A TEMPERATURE CONTROL DEVICE

(75) Inventor: Stefan Hirsch, Stuttgart (DE)

(73) Assignee: MAHLE International GmbH, Stuttgart (DE)

( * ) Notice: Subject to any disclaimer, the term of this patent is extended or adjusted under 35 U.S.C. 154(b) by 0 days.

(21) Appl. No.: 13/544,455

(22) Filed: Jul. 9, 2012

(65) Prior Publication Data
US 2013/0011705 A1 Jan. 10, 2013

(30) Foreign Application Priority Data

Jul. 8, 2011 (DE) .......................... 10 2011 078 897

(51) Int. Cl.
*F28F 3/12* (2006.01)
*H01M 10/613* (2014.01)
*H01M 10/625* (2014.01)
*H01M 10/6556* (2014.01)

(52) U.S. Cl.
CPC .......... *H01M 10/613* (2015.04); *H01M 10/625* (2015.04); *H01M 10/6556* (2015.04); *H01M 2220/20* (2013.01); *Y10T 29/49108* (2015.01)

(58) Field of Classification Search
CPC ... F28D 9/0068; F28D 9/0062; F28D 9/0037; F28D 9/0031; F28D 1/03; F28D 1/02; H01M 10/504; H01M 10/5053; H01M 10/5004; H01M 10/0525; F28F 1/10; F28F 1/32; F28F 1/325; F28F 3/14; F28F 3/12; F28F 3/00

USPC .......... 220/200; 428/596, 166, 34.1, 172, 68, 428/600; 228/101, 221; 29/623.1, 890.03; 429/120, 72; 165/67, 70, 66, 172–183, 165/80.4, 81
See application file for complete search history.

(56) References Cited

U.S. PATENT DOCUMENTS 5,514,487 A * 5/1996 Washington ........ H01M 8/0273
429/458
7,036,572 B2 * 5/2006 Sohn ................... F16H 57/0415
165/175

(Continued)

FOREIGN PATENT DOCUMENTS

| DE | 10 2008 059 955 A1 | 6/2010 | | |
|---|---|---|---|---|
| DE | 102008059955 | * | 6/2010 | ............ H01M 10/50 |
| WO | 10 2008 059 961 A1 | 6/2010 | | |
| WO | WO2010121831 | * | 10/2010 | .............. H01M 2/30 |

OTHER PUBLICATIONS

English Translation of DE102008059955.*

*Primary Examiner* — Patrick Ryan
*Assistant Examiner* — Kiran Quraishi
(74) *Attorney, Agent, or Firm* — Muncy, Geissler, Olds & Lowe, P.C.

(57) ABSTRACT

A temperature control device is provided for the temperature control of a battery. The temperature control device has an upper part with an upper side and an underside, which has on the upper side a thermal interface to the battery. Furthermore, the temperature control device has at least one lower part, which has an embossed structure in order to embody a sealing edge and to embody a cavity for guiding temperature control fluid. The sealing edge is arranged on an upper side of the lower part, and is connectable to the underside of the upper part in a fluid-tight manner.

22 Claims, 6 Drawing Sheets

(56) References Cited

U.S. PATENT DOCUMENTS

| | | | |
|---|---|---|---|
| 2002/0195237 A1* | 12/2002 | Luz | F28D 9/0043 165/153 |
| 2008/0066893 A1* | 3/2008 | Oh | F28D 1/0341 165/153 |
| 2012/0183823 A1* | 7/2012 | Von Borck | H01M 2/1061 429/81 |

* cited by examiner

TEMPERATURE CONTROL DEVICE FOR THE TEMPERATURE CONTROL OF A BATTERY AND METHOD FOR THE PRODUCTION OF A TEMPERATURE CONTROL DEVICE

This nonprovisional application claims priority under 35 U.S.C. §119(a) to German Patent Application No. DE 10 2011 078 897.2, which was filed in Germany on Jul. 8, 2011, and which is herein incorporated by reference.

BACKGROUND OF THE INVENTION

1. Field of the Invention

The present invention relates to a temperature control device for the temperature control of a battery, as well as to a method for the production of a temperature control device for the temperature control of a battery.

2. Description of the Background Art

With the use of modern high-performance batteries constructed from a number of individual cells, such as e.g. accumulators or secondary batteries for electric or hybrid vehicles, care must be taken that the temperature of the battery during operation is within a certain interval, in order to ensure the efficiency, functionality and safety of the device. This is based on the fact that the efficiency of the battery cells drops very sharply when the temperature falls below a suitable operating temperature, and the cells thereby produce a high loss performance. On the other hand, above a suitable operating temperature range, processes proceed within the cells that lead to irreversible damage. Furthermore, to avoid an uneven and thus concomitant increased aging of individual battery cells, the temperature differences inside the individual cells and in the total battery stack must not exceed certain boundary values.

SUMMARY OF THE INVENTION

It is therefore an object of the present invention to create an improved temperature control device for the temperature control of a battery, as well as an improved method for the production of a temperature control device for the temperature control of a battery.

This object is attained by a temperature control device for the temperature control of a battery, as well as a method for the production of a temperature control device for the temperature control of a battery.

For the battery cooling, a cooling medium is preferably used that is in thermal contact with the battery via a connection. To this end, e.g. refrigerants, cooling agents or air can be used as the cooling medium. Likewise a combination of two or more media, which are used according to operating requirements and environmental requirements, is possible. Since the dissipated heat of the battery, like the environmental requirements, can vary greatly, the cooling must be matched to the changing conditions.

A heat exchanger can be used for the temperature control of a battery, which heat exchanger is constructed of two plates facing each other. By means of a concentration of embossed design features in a first one of the plates of the heat exchanger, embossing can be omitted in a second plate. Thus a flat or only tilted plate can be used as a second plate of the heat exchanger.

Advantageously a savings in tool costs can be achieved by using a flat plate as the second side of the heat exchanger. In addition, a flat second side enables a good thermal connection of the battery to the heat exchanger.

A design system and production system for a battery cooler in two-layer design (2L-plate) is described, which can be extended with flat tubes. The system has a high flexibility and thus enables a cost-efficient production of various battery cooler dimensions.

Since electric or hybrid vehicles are currently still being produced in small production runs, a standardization of cells or complete batteries has not yet progressed greatly, which leads to many different battery coolers with small production runs and makes scale-up effects more difficult. Therefore the connection presented here avoids production methods that are otherwise usual in automotive technology, such as stamping tools or embossing tools which are manufactured for a cooler type in a proprietary manner. By these means the temperature control device can be produced in a cost-effective manner.

The present invention creates a temperature control device for the temperature control of a battery, wherein the temperature control device can include an upper part with an upper side as a thermal interface to the battery and to an underside, and include at least one lower part, which has an embossed structure in order to embody a sealing edge and to embody a cavity for guiding temperature control fluid, wherein the sealing edge is arranged on an upper side of the lower part, and is connected to the underside of the upper part in a fluid-tight manner.

A temperature control device can be understood to mean a heat exchanger. A battery can be an accumulator and can have several cells. The battery can have a flat contact area. An upper part can be manufactured from a plate material or metal sheet. The upper part can have an essentially flat area on a surface. The flat area can be embodied as an interface for transferring thermal energy from and to the battery. A lower part can be manufactured from a plate material or metal sheet. An embossed structure can be a drawn structure, in particular a deep-drawn structure. A sealing edge can be shaped in order to come into contact with another area and to enter into a fluid-tight connection with the other area. A temperature control fluid can for example be water or a refrigerant.

The temperature control device can have at least one flat tube for guiding the temperature control fluid. The at least one flat tube can be connected in a heat-conducting manner to the underside of the upper part, and the at least one underside can have at least one passage interrupting the sealing edge for accommodating the at least one flat tube. A passage can be an opening that is embodied to accommodate one or more flat tubes. The at least one flat tube can have a rectangular, acute-angled cross-section. The at least one flat tube can bear against the upper part flat. The passage can be embodied as a notch out of the lower part. The flat tube can be connected to the upper part by soldering. The temperature control device can be adjusted simply to different battery sizes by means of a flat tube connection between two cavities in one or more lower parts, without having to obtain new tools. The flat tube can be arranged in the passage and can be connected in a fluid-tight manner to the upper part and the lower part.

The temperature control device can also have at least one further flat tube for guiding the temperature control fluid, wherein the at least one further flat tube is connected in a heat-conducting manner to the underside of the upper part and is oriented parallel to the flat tube. The at least one lower part can have at least one further passage interrupting the sealing edge for accommodating the at least one further flat tube.

The lower part can be connected to the upper part mechanically between the flat tube and the further flat tube in the area of the sealing edge. To this end a mechanical connection can be created before the soldering. The lower part can clamp and fix the flat tubes to the upper part by means of the mechanical connection, so that the tubes can no longer slip.

The lower part can have two cuts in order to embody one passage each, wherein the cuts are oriented to opposite narrow sides of a flat tube cross-section of the flat tube. The cuts can be embodied for this purpose in order to embody the passage between the upper part and the lower part. The two cuts can delimit laterally a tab that is embodied in order to exert pressure on the flat tube in order to fix the flat tube. Due to the cuts, a cavity is formed in the lower part, which can be embodied in a rectangular manner. The flat tube can be soldered particularly well thereby.

The lower part can have at least one embossed bump that is arranged on the upper side of the lower part. A bump can be a boss-shaped elevation on the upper side. The bump can be embossed as a boss-shaped depression on the underside. The bump can extend up to the underside of the upper part. Then the bump can have a contact surface to the underside of the upper part and can be connected to the upper part in a fluid-tight manner at the contact area. The bump can endow the temperature control device with a greater stability. Likewise the bump can lead to an improved heat removal.

The upper part can have at least one through hole, wherein a bump of the lower part is oriented coaxially to the through hole and the bump embodies an annular further sealing edge that is connected to the upper part in a fluid-tight manner. The through hole can be arranged in the area of the chamber of the temperature control device. By means of the through hole, the battery can for example be fixed to the temperature control device. An inner diameter of the annular sealing edge can be larger than or the same as a diameter of the through hole.

The lower part can be connected to the upper part in the area of the sealing edge by means of a pre-fixing. A pre-fixing can be a mechanical connection. For example the pre-fixing can take place by means of a press-joining process. Likewise the pre-fixing can take place by means of a spot-welded process. Or the pre-fixing can take place by means of a rivet process. By means of the pre-fixing, the individual parts in a piece of equipment can be placed relative to one another for assembly, be temporarily fixed in their position, and be safely removed from the piece of equipment. Subsequently the temperature control device can be joined together in a fluid-tight manner in a soldering device.

The upper part can have an embossed structure. The structure of the upper part can be arranged at a position at which there is no contact with the lower part and/or the flat tubes. For example, the upper part can have a flanged edge that is embodied in order to fix the battery. Likewise the upper part can have at least one connection for supplying the temperature control device with cooling medium. The upper part can also have at least one through hole for fixing the battery. The embossed structure can be embodied for example as at least one stiffening bead.

The present invention furthermore creates a method for the production of a temperature control device for the temperature control of a battery, wherein the temperature control device has an upper part with an upper side as a thermal interface to the battery and an underside, a lower part with an embossed structure for embodying a sealing edge interrupted by at least one passage and for embodying a cavity for guiding temperature control fluid, and at least one flat tube for guiding the temperature control fluid, wherein the method comprises the following steps:

Arranging the at least one flat tube on the underside of the upper part, wherein the at least one flat tube is oriented to at least one passage of the at least one lower part;

Placing the sealing edge of the at least one lower part on the underside of the upper part and on the at least one flat tube, wherein the at least one passage is oriented to the flat tube;

Pre-fixing the at least one lower part with respect to the upper part at at least one point of the sealing edge by means of a mechanical connection; and Joining the at least one lower part, the upper part and the at least one flat tube to form a fluid-tight unit, at least in the area of the sealing edge and the passages.

The joining can take place for example by means of a soldering process. The passages with stamped/cut edges are to be connected together with rectangular extruded flat tubes in a particularly advantageous manner to be securely fluid-tight. The flat tubes can be joined over their entire surface to the underside of the upper part, in order to obtain good heat conductivity.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

In the description below of the preferred exemplary embodiments of the present invention, the same or similar reference numbers are used for the elements that are shown in the various drawings and act in a similar manner, wherein a repeated description of these elements is omitted.

Figure 1:
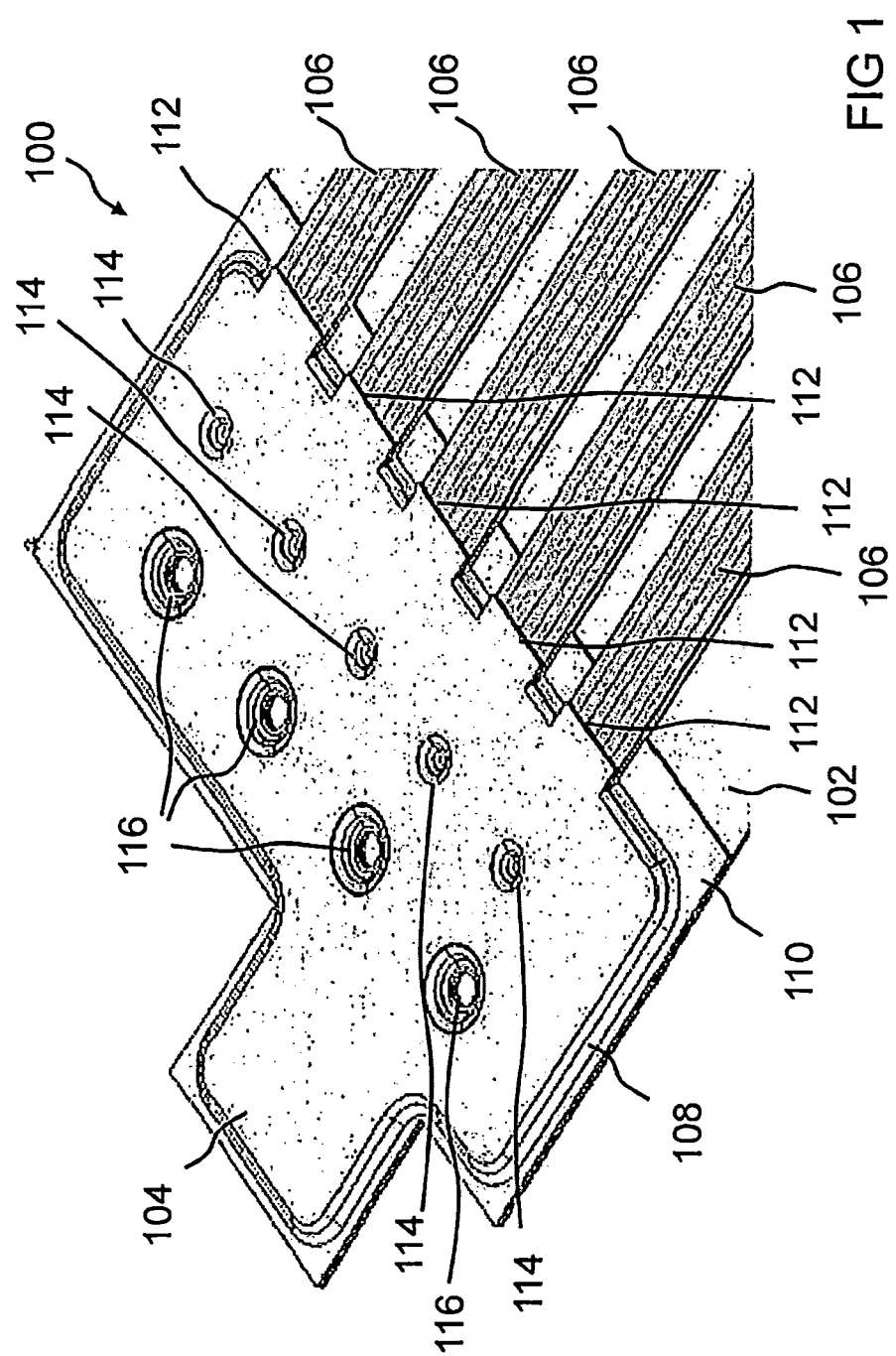
FIG. 1 a view of a temperature control device according to an exemplary embodiment of the present invention.

FIG. 1 shows a view of a section of a temperature control device 100 for the temperature control of a battery according to an exemplary embodiment of the present invention. The temperature control device 100 is joined together in a fluid-tight manner from several individual parts by means of a soldered connection. In this exemplary embodiment the temperature control device comprises an upper part 102, at least one lower part 104 as well as five flat tubes 106. The upper part 102 is embodied as a flat plate without raised structures. In the section shown, the upper part 102 has a contour embodied as a right angle as an outline, wherein at a narrow side of a rectangular body of the upper part 102 a rectangular tongue is adjoined off-center. The lower part 104 is embodied as a flat plate with embossed structures. The lower part is embodied congruent with parts of the upper part 102. The lower part 104, like the upper part 102, has a rectangular contour, wherein on a broad side of a rectangular body of the lower part 104, a rectangular tongue is adjoined off-center. The lower part 104 has a continuous bead 108. By means of the bead 108 a plane of a large part of the lower part 104 is offset parallel to a sealing edge 110 surrounding the lower part 104. The sealing edge 110 is connected in a fluid-tight manner to an underside of the upper part 102.

On a broad side arranged opposite the tab, the lower part 104 has five passages 112 for accommodating the five flat tubes 106. The passages 112 are embodied by respectively two parallel cuts through the sealing edge 110 and the bead 108. A resulting tab is shortened and oriented in elongation of the plane of the large part of the lower part 104. The sealing edge 110 and the bead 108 are interrupted in the area of one passage 112 each. Between the tabs and the underside of the upper part 102, five openings are embodied that respectively form an outer contour of a flat tube 106. The flat tubes 106 are arranged on the underside of the upper part 102 and a flat side of the flat tubes 106 is connected to the upper part in a heat-conducting manner. The flat tubes 106 are oriented parallel to one another and parallel to a broad side of the upper part 102. The flat tubes 106 project through the passages 112 into a chamber between the upper part 102 and the lower part 104. The flat tubes 106 are soldered into the passages 112 in a fluid-tight manner.

The lower part 104 furthermore has bumps 114, 116. The bumps 114, 116 are embodied as elevations into the chamber between the upper part 102 and the lower part 104. The bumps 114 are shaped such that a highest point of the bumps 114 touches the upper part 102, in order to support the lower part 104 with respect to the upper part 102. The lower part 104 has five supporting bumps 114, which in extension respectively of one of the flat tubes 106 are arranged in a row parallel to the broad side of the lower part 104. The bumps 116 are annular in shape and enclose respectively one through hole in the upper part 102. The bumps 116 each form a further sealing edge, which is connected to the upper part around the through hole in a fluid-tight manner. The through holes are for example for fixing the battery to the temperature control device 100. The lower part 104 has four annular bumps 116, which are arranged uniformly distributed in a line parallel to the broad side of the lower part 104.

Figure 2:
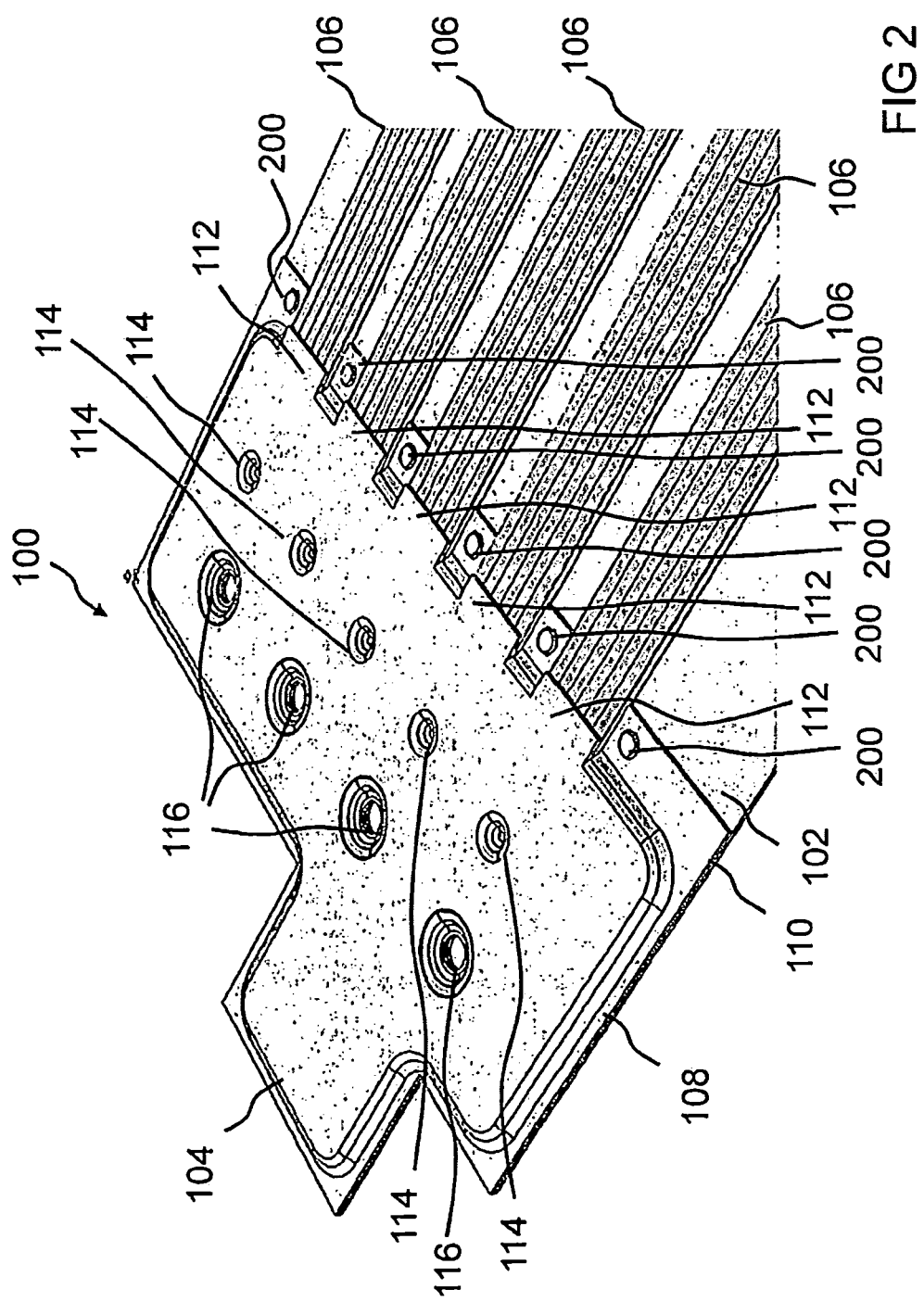
FIG. 2 a view of a temperature control device according to a further exemplary embodiment of the present invention.

FIG. 2 shows a section of a temperature control device 100 according to an exemplary embodiment of the present invention. The temperature control device 100 is embodied as a so-called modular tube plate and has the features as described in FIG. 1. In addition the temperature control device has six pre-fixings 200 of the lower part to the upper part. As described based on FIG. 1, the temperature control device 100 has a flat upper part 102, an embossed distributor as lower part 104, as well as five flat tubes 106. The lower part 104 has five bumps 114 for increasing the strength and improving the heat transfer. Moreover the lower part 104 has four bumps 116 for four through holes. Four pre-fixings 200 are arranged in the sealing edge 110 respectively in interstices between the flat tubes 106. In addition two pre-fixings 200 are arranged adjoining the outer flat tubes 106 between a broad side of the upper part 102 and the outer flat tubes 106 in the sealing edge 110.

According to an exemplary embodiment a battery cooler 100 is based on a design system that has as upper part 102 a preferably flat, one-piece plate 102. The plate 102 serves on the one hand as a contact area or function area for cooling or heating the battery cells and on the other hand forms half of the collector or distributor.

Furthermore the cooler 100 can have at least two further plates 104, which form the other halves of the collector or distributor. In these further plates 104, both channel structures for guiding the cooling medium, and elements, e.g. bumps 114, can be embossed, which on the one hand serve to increase the structural strength with inner pressure or outer pressure or on the other hand serve to raise the thermodynamic heat transfer performance. Larger variants of these bumps 116 can be used at any desired point in the collector area or distributor area, in order to realize through holes, for example for purposes of fixing. Moreover the embossed collector halves or distributor halves 104 can have cuts or embossings 108 at the edge for the accommodation and tight soldering of flat tubes 106 for the targeted and cost-efficient media guidance.

Furthermore the cooler 100 can have flat tubes that are inserted between collector and distributor and are connected to the flat plate 102 with adhesive force by soldering. The flat tubes 106 have a rectangular profile that is as sharp-edged as possible. The position and spaces between the tubes 106 can be selected almost freely. By these means, further through holes, heating elements or brace elements in various dimensions can be arranged between the tubes 106 as desired.

The preferably flat, preferably one-piece, plate 102 can also contain flanges at the edge for further increasing the strength. Moreover the upper part 102 can have through holes or embossings, e.g. beads for fastening or strengthening purposes. However, the plate 102 can also be composed of several parts.

Several flat tubes 106 can also be put together lying immediately adjacent to one another in a broader passage 112. Through the embossed collector halves or distributor halves 104, a high flexibility in the geometric form is possible, as well as in the arrangement or placing of through holes and connecting flanges. By means of the embossed collector or distributor 104 and the flat tubes 106, a simple single-axis assembly is possible by placing the flat tubes 106 on the flat plate 102 and covering it with the collector halves or distributor halves 104.

Through the pre-fixing 200, all the individual parts can be secured in their position, so that during the further handling, e.g. moving into a soldering device or vibrations during soldering, a slipping or falling apart can safely be avoided.

Figure 3:
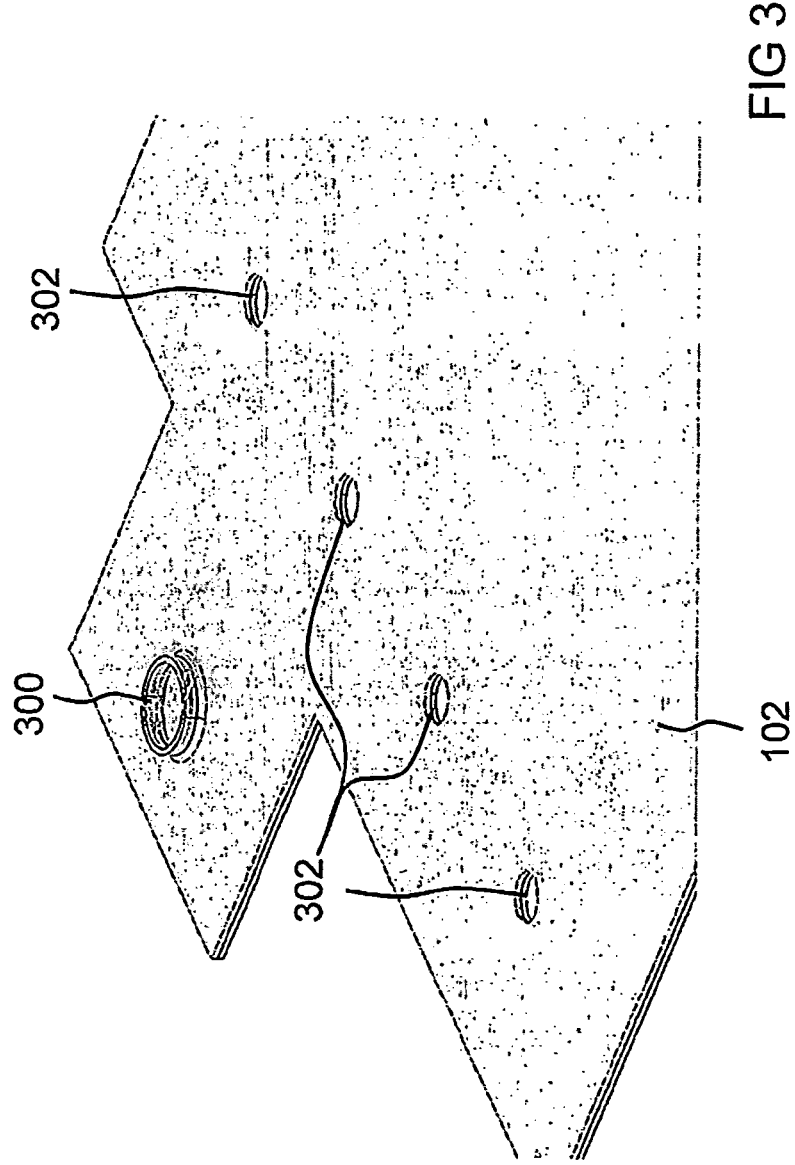
FIG. 3 a view of an upper part for a temperature control device according to an exemplary embodiment of the present invention.

FIG. 3 shows a section of an upper part 102 of a temperature control device according to an exemplary embodiment of the present invention. The upper part 102 is preferably embodied flat and in one piece. In the section shown, the upper part 102 has a contour embodied in a rectangular manner, wherein on one narrow side of a rectangular body of the upper part 102, a rectangular tongue is joined off-center. In the area of the tongue, the upper part has a connection 300 for a cooling medium. The connection is embodied as an embossed, annular collar. In an area in which the one distributor will be arranged, the upper part has four through holes 302, for example for fixing purposes. The through holes 302 are arranged uniformly distributed in a line parallel to a front face of the upper part 102.

Through the flat, preferably one-piece, plate 102, a uniform interface to the cells of the battery with high basic strength is created.

Figure 4:
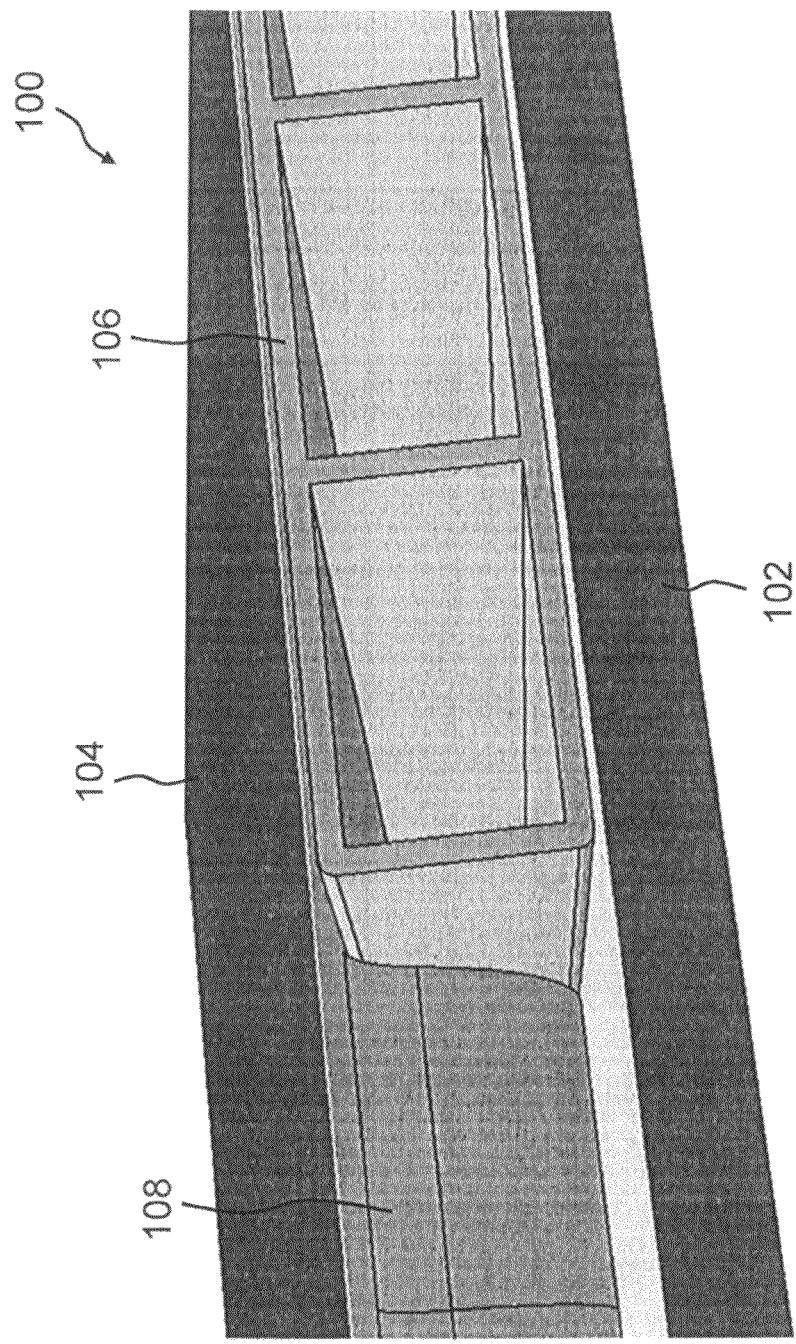
FIG. 4 a cross-sectional view of a temperature control device according to an exemplary embodiment of the present invention.

FIG. 4 shows a section through a temperature control device 100 according to an exemplary embodiment of the present invention. A viewpoint from a cavity of the temperature control device 100 in the outside direction is shown. The temperature control device 100 has an upper part 102, a lower part 104, as well as at least one flat tube 106, which are connected together in a fluid-tight manner. The upper part 102 is here embodied flat. The lower part 104 is here embodied as an embossed distributor with at least one cut or embossed passage for the at least one flat tube 106. The flat tube 106 has a flat rectangular cross-section with a small amount of rounding and several rectangular channels arranged adjacent to one another. The flat tube 106 is pushed into the passage, so that it projects beyond an embossed bead 108 of the lower part 104. A lateral cut edge of the passage is embodied flush with a narrow side of the flat tube 106. On a flat side, the flat tube is in contact with an underside of the upper part 102 and on the other flat side with an upper side of the lower part 104.

Figure 5:
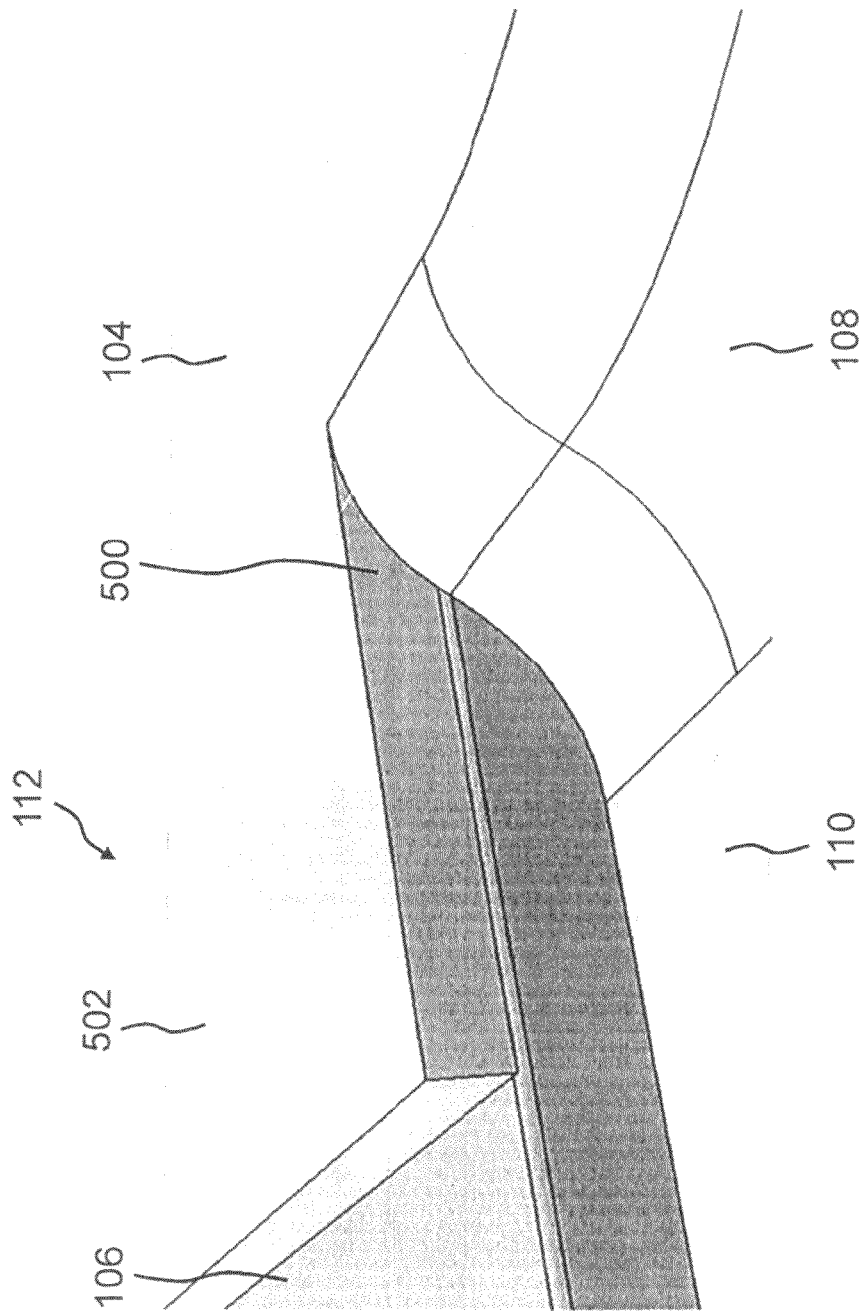
FIG. 5 a detail view of a passage with an inserted flat tube of a temperature control device according to an exemplary embodiment of the present invention.

FIG. 5 shows in detail the passage 112 from FIG. 4 according to an exemplary embodiment of the present invention. The lower part 104 is shown with a side of the passage 112 and the flat tube 106. The lower part is embodied as an embossed distributor with a cut or embossed passage for the flat tube 106. For this purpose two cuts 500 are introduced into the lower part 104 per flat tube 106, which cuts are oriented to the longitudinal edges of the flat tube 106. The cutting procedure can be carried out in an operational step of the embossing of the lower part. A tab 502 remains between the cuts 500 in a width of the flat tube 106 in an original plane of the starting material of the lower part 104. The bead 108 and the sealing edge 110 run adjacent to the tab 502 on both sides.

A secure sealing soldering is possible by using the sharp-edged cut and embossed passages 112 in combination with sharp-edged rectangular flat tubes 106.

Figure 6:
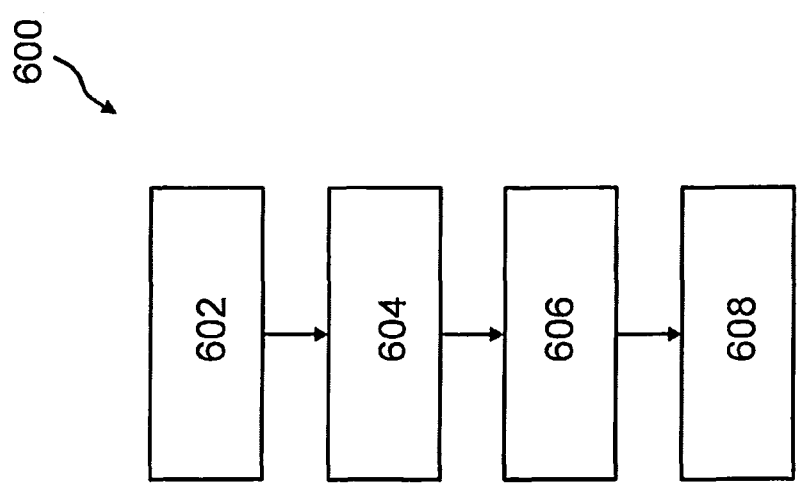
FIG. 6 a flow diagram of a method for the production of a temperature control device according to an exemplary embodiment of the present invention.

FIG. 6 shows a flow diagram of a method 600 for the production of a temperature control device according to an exemplary embodiment of the present invention. The temperature control device as described in the above Figures, has an upper part with an upper side and a lower side. The upper part has on the upper side a thermal interface to the battery. The temperature control device has at least one lower part, which has an embossed structure for embodying a sealing edge and for embodying a cavity for guiding temperature control fluid. The sealing edge has at least one passage interrupting the sealing edge. Furthermore the temperature control device has at least one flat tube for guiding the temperature control fluid.

The method 600 for the production of the temperature control device for the temperature control of a battery has an arranging step 602, a placing step 604, a pre-fixing step 606, and a joining step 608.

In the arranging step 602, at least one flat tube is arranged on the underside of the upper part, and is oriented to at least one passage of the at least one lower part. In the placing step 604, the sealing edge of the at least one lower part is placed on the underside of the upper part and on the at least one flat tube. The at least one passage is oriented to the flat tube thereby. In the pre-fixing step 606, the at least one lower part is pre-fixed with respect to the upper part at at least one point of the sealing edge. To this end one or more mechanical connections are used. In the joining step 608, the at least one lower part, the upper part, and the at least one flat tube are joined to form a fluid-tight unit. The individual components are joined thereby at least in the area of the sealing edge and the passages.

The described exemplary embodiments are selected only by way of example and can be combined with one another.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A temperature control device for a temperature control of a battery, the temperature control device comprising:
    an upper plate with an upper side as a thermal interface to the battery and to an underside;
    at least one lower plate, which has an embossed structure in order to embody a sealing edge and to embody a cavity for guiding temperature control fluid, the upper plate being overlaid over and connected to the lower plate such that the upper plate and the lower plate form a housing with the cavity therebetween;
    at least one passage disposed between the upper plate and the lower plate, the at least one passage providing entry into the cavity of the housing; and
    at least one flat tube inserted into the cavity via the at least one passage and configured to guide the temperature control fluid,
    wherein the sealing edge is arranged on an upper side of the lower plate, and is soldered to the underside of the upper plate in a fluid-tight manner,
    wherein a first portion of the at least one flat tube extends into the cavity and a second portion of the at least one flat tube extends to an outside of the at least one passage, such that the second portion of the at least one flat tube is positioned outside of the housing, and
    wherein the at least one flat tube is discrete from the upper plate, the at least one lower plate, the cavity and the at least one passage.

2. The temperature control device according to claim 1, wherein the at least one flat tube is connectable in a heat-conducting manner to the underside of the upper plate and wherein the at least one passage interrupts the sealing edge for accommodating the at least one flat tube.

3. The temperature control device according to claim 2, further comprising at least one further flat tube for guiding the temperature control fluid, wherein the at least one further flat tube is connectable in a heat-conducting manner to the underside of the upper plate and is oriented parallel to the flat tube, wherein the at least one lower plate has at least one further passage interrupting the sealing edge for accommodating the at least one further flat tube.

4. The temperature control device according to claim 3, wherein the lower plate is connectable to the upper plate mechanically between the flat tube and the further flat tube in an area of the sealing edge.

5. The temperature control device according to claim 2, wherein the lower plate has two cuts in order to embody the passage, wherein the cuts are oriented to opposite narrow sides of a flat tube cross-section of the flat tube and are configured to embody the passage between the upper plate and the lower plate.

6. The temperature control device according to claim 1, wherein the lower plate has at least one embossed bump that is arranged on the upper side of the lower plate.

7. The temperature control device according to claim 6, wherein the upper plate has at least one through hole, wherein a bump of the lower plate is oriented coaxially to the through hole, and wherein the bump embodies an annular further sealing edge that is connectable to the upper plate in a fluid-tight manner.

8. The temperature control device according to claim 1, wherein the lower plate is connectable to the upper plate in an area of the sealing edge via a pre-fixing.

9. The temperature control device according to claim 1, wherein the upper plate has an embossed structure.

10. The temperature control device according to claim 1, wherein the upper plate comprises a flat or tilted plate.

11. The temperature control device according to claim 1, wherein the upper plate is devoid of embossing.

12. The temperature control device according to claim 1, wherein the upper plate comprises an essentially flat surface.

13. The temperature control device according to claim 1, wherein the upper plate comprises a contour positioned at a right angle.

14. The temperature control device according to claim 1, wherein the upper plate further comprises a rectangular tongue adjoined to the upper plate.

15. The temperature control device according to claim 1, further comprising at least one bump, on the lower plate, extending into an area between the upper plate and the lower plate.

16. The temperature control device according to claim 1, wherein the upper plate comprises a plurality of uniformly distributed holes.

17. A device, comprising:
an upper plate;
a lower plate, the lower plate comprising an embossed structure defining a cavity for guiding a fluid, the upper plate being overlaid over and connected to the lower plate such that the upper plate and the lower plate form a housing with the cavity therebetween;
a sealing edge arranged on an upper side of the lower plate and connected to an underside of the upper plate in a fluid-tight manner;
a flat tube, for guiding the fluid, connected to the underside of the upper plate; and
a passage disposed between the upper plate and the lower plate and interrupting the sealing edge, such that the passage provides entry into the cavity,
wherein a first portion of the flat tube extends into the cavity via the passage and a second portion of the flat tube extends to an outside of the passage, such that the second portion of the flat tube is positioned outside of the housing, and
wherein the flat tube is discrete from the upper plate, the lower plate the cavity and the passage.

18. The device according to claim 17, wherein the flat tube is one of a plurality of flat tubes and the passage is one of a plurality of passages, the plurality of flat tubes being received by the plurality of passages.

19. A device, comprising:
a battery; and
a temperature control device connected to the battery, the temperature control device comprising:
an upper plate;
a lower plate, the lower plate comprising an embossed structure defining a cavity for guiding a fluid, the upper plate being overlaid over and connected to the lower plate such that the upper plate and the lower plate form a housing with the cavity therebetween;
a sealing edge arranged on an upper side of the lower plate and connected to an underside of the upper plate in a fluid-tight manner;
a flat tube, for guiding the fluid, connected to the underside of the upper plate; and
a passage disposed between the upper plate and the lower plate and interrupting the sealing edge, such that the passage provides entry into the cavity,
wherein a first portion of the flat tube extends into the cavity via the passage and a second portion of the flat tube extends to an outside of the passage, such that the second portion of the flat tube is positioned outside of the housing, and
wherein the flat tube is discrete from the upper plate, the lower plate, the cavity and the passage.

20. The device according to claim 19, wherein the lower plate comprises one or more cuts that laterally delimit a tab configured to fix the flat tube within the passage.

21. The device according to claim 20, wherein the one or more cuts define a cavity within the lower plate.

22. The device according to claim 19, wherein the lower plate is congruent with parts of the upper plate.

* * * * *